Oct. 23, 1962  J. P. GIBBS ETAL  3,060,396
TRANSDUCER
Filed Aug. 29, 1960  3 Sheets-Sheet 1
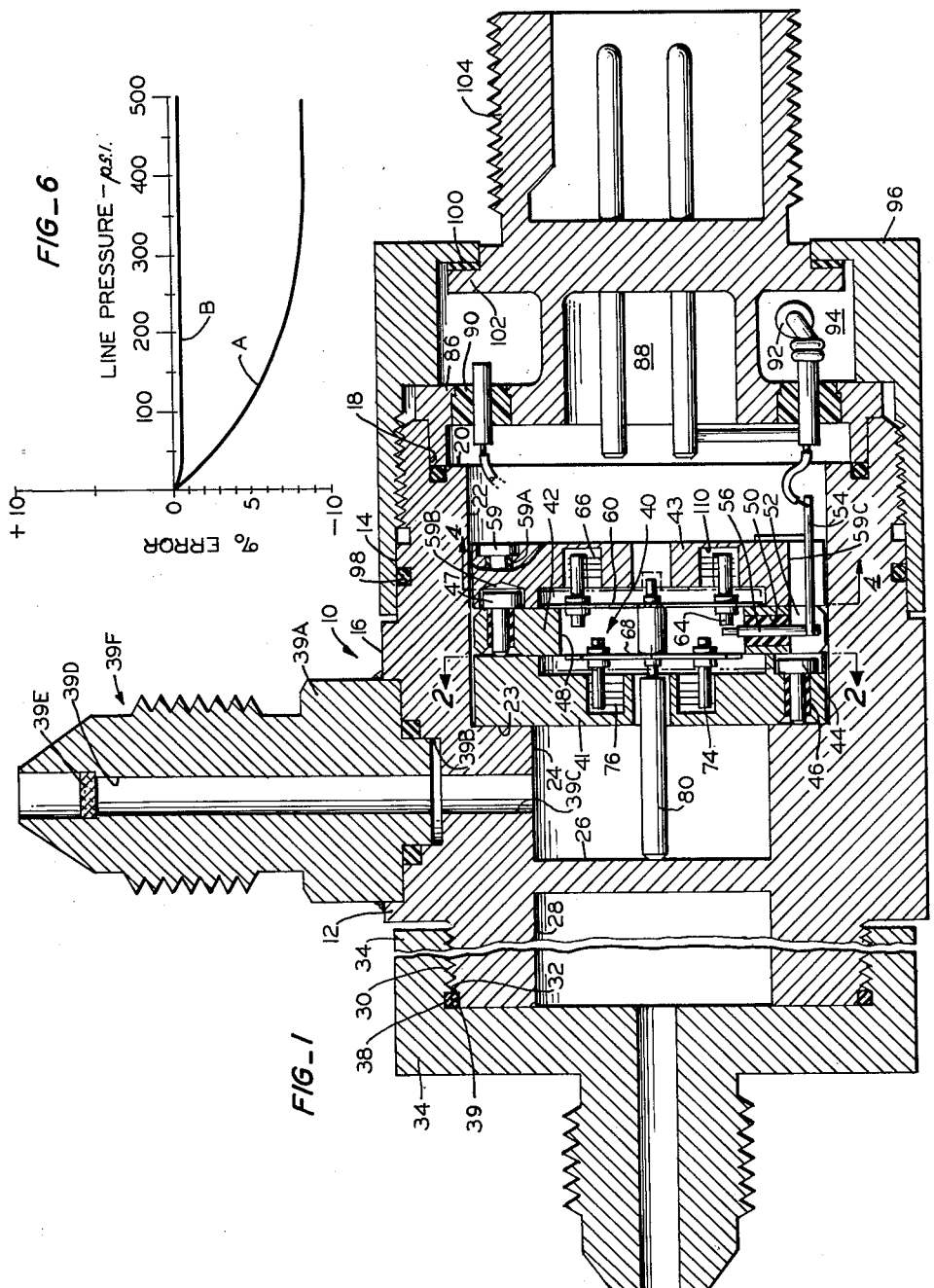
INVENTORS.
JOSEPH P. GIBBS
ROBERT E. STANAWAY
BY
Christie, Parker & Hale
ATTORNEYS

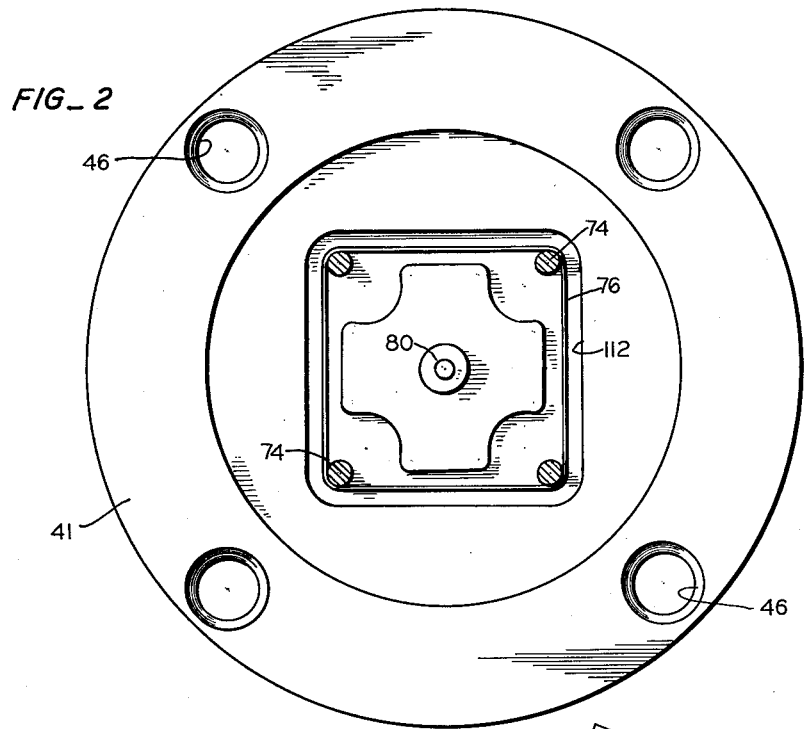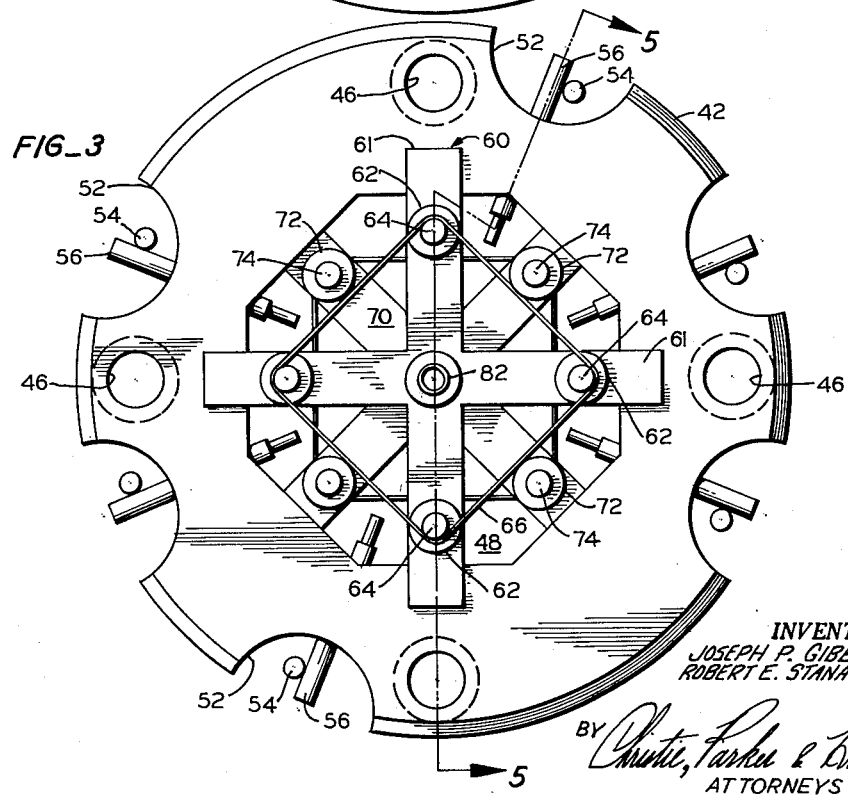

Oct. 23, 1962  J. P. GIBBS ETAL  3,060,396
TRANSDUCER
Filed Aug. 29, 1960  3 Sheets-Sheet 3
FIG_4
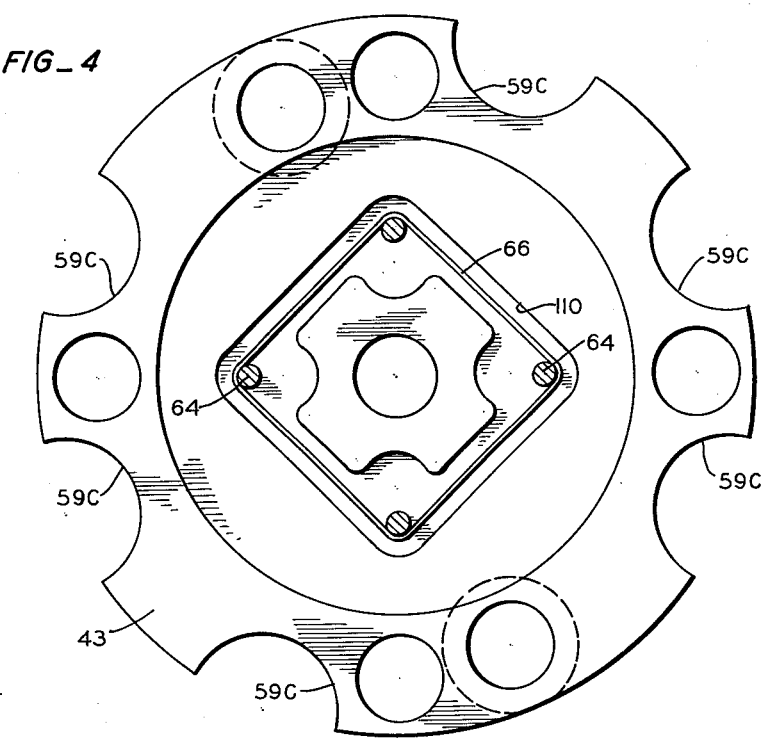
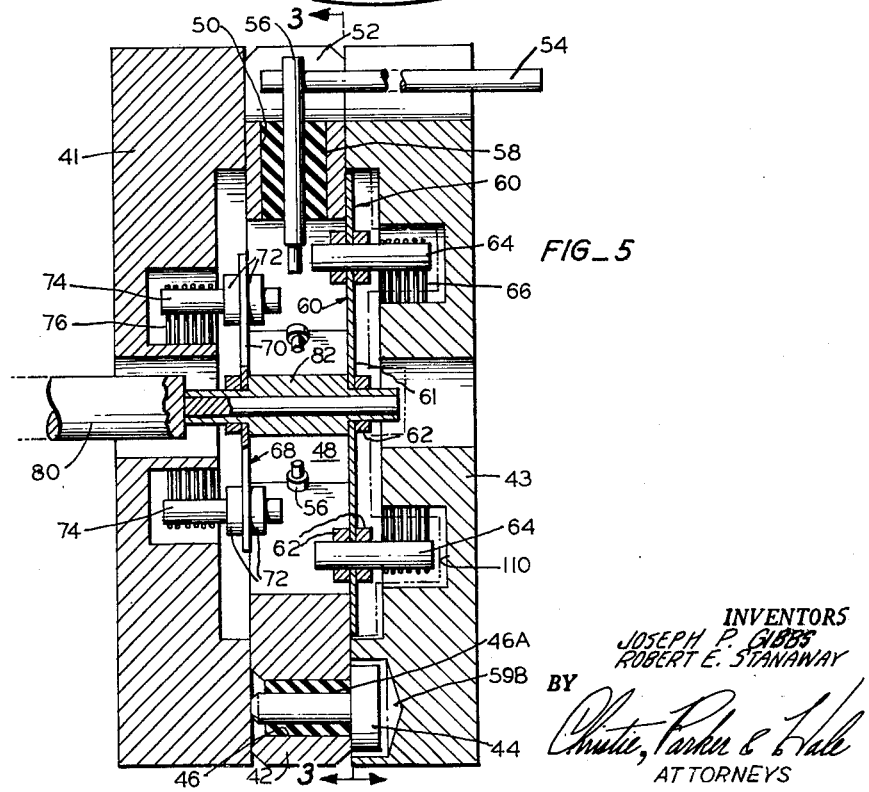
FIG_5
INVENTORS
JOSEPH P. GIBBS
ROBERT E. STANAWAY
BY
Christie, Parker & Hale
ATTORNEYS

United States Patent Office 3,060,396
Patented Oct. 23, 1962

3,060,396
TRANSDUCER
Joseph P. Gibbs, Arcadia, and Robert E. Stanaway, Pasadena, Calif., assignors to Consolidated Electrodynamics Corporation, Pasadena, Calif., a corporation of California
Filed Aug. 29, 1960, Ser. No. 52,458
1 Claim. (Cl. 338—4)

This invention provides an improvement in transducers of the strain gage type which convert physical force into an electrical signal indicative of the magnitude of the force.

It has been common practice to use electromechanical transducers to measure physical forces such as pressure, acceleration, and displacement by using the force to change the strain in a wire whose electrical resistance varies with strain. Ordinarily, the strain sensing element includes one or more strain sensitive wires mounted in an instrument case in a 4-arm electrical Wheatstone bridge circuit to measure changes in resistance of the wires due to strain variations produced by the force to be measured.

An excitation voltage is applied to the input of the bridge circuit, resulting in the dissipation of power or heat from the strain wires. In a typical instrument the strain wires are on the order of 100° F. hotter than the surrounding instrument case.

The electrical resistivity of the strain wires vary with temperature, which affects the output of the bridge circuit. Under any given conditions each portion of the strain wire tends to reach an equilibrium condition at which the bridge may be electrically balanced, i.e., have no output due to thermal effects. However, as the temperature changes, due, for example, to changes in excitation voltage, or the case being exposed to fluctuating ambient temperatures, errors or spurious signals are produced if all portions of the strain wires do not tend to move toward the new equilibrium condition at substantially the same rate.

In addition to the errors produced by transient thermal effects, differential transducers are subject to another source of errors due to heat problems. A typical differential transducer measures differences in fluid pressures by sensing the net resultant force across a diaphragm.

Usually the strain wires are in direct contact with fluid subject to changing pressure. When the fluid is a gas, heat dissipation from the strain wires in prior instruments varies markedly with changes in the gas pressure. Thus, even though the differential pressure across the diaphragm remains constant, errors can result as the total pressure of the gas changes due to the change in heat dissipation from the strain wires.

This invention reduces these sources of error to a negligible quantity by mounting the strain sensitive wire closely adjacent a body with good heat conductivity so there is a maximum amount of heat transfer from the wire, thus reducing the operating temperature of the wire, decreasing the time required for the wire to reach thermal equilibrium, and minimizing changes in heat transfer due to variations in the pressure or density of the fluid medium surrounding the wire.

In the preferred form, the invention includes a plurality of strain wires mounted in a bridge circuit with each wire disposed in a separate respective groove in a body of good heat conductivity and in good heat-transfer relationship with the instrument case surrounding the wires. The wires are so arranged that their respective rates of heat transfer to the adjacent body are substantially equal to insure that the wires move toward thermal equilibrium at the same rates. The preferred arrangement of the body surrounding the strain wires is such that it isolates the wires from each other and breaks up convection currents and density gradient effects which are present in strain gages prior to this invention, and which are another source of instrument instability.

These and other aspects of the invention will be more fully understood from the following detailed description taken in conjunction with the accompanying drawings, in which:

FIG. 1 is a longitudinal sectional elevation of the preferred embodiment of the invention;
FIG. 2 is a view generally taken on line 2—2 of FIG. 1;
FIG. 3 is a view generally taken on line 3—3 of FIG. 5;
FIG. 4 is a view generally taken on line 4—4 of FIG. 1;
FIG. 5 is a view generally taken on line 5—5 of FIG. 3; and
FIG. 6 is a plot of two curves showing how the invention reduces the error caused in a differential transducer by variation in total gas pressure.

Referring to FIG. 1, a differential transducer 10 includes a thick walled case 12 of a generally cylindrical shape. The case 12 has a right end (as viewed in FIG. 1) section 14 which is of a slightly smaller outside diameter than a central adjoining portion 16. A first relatively large cylindrical bore 18 begins at the right end of the case and terminates in an annular shoulder 20, which marks the beginning of a second inwardly extending cylindrical bore 22, which terminates in a second annular shoulder 23. A third cylindrical bore 24 extends inwardly from the annular shoulder 23 to terminate at its inner end to form the right side of a force summing diaphragm 26. A fourth cylindrical bore 28 extends from the left side of the force summing diaphragm to the left end of the case to form a deep chamber on the left side of the diaphragm. The outside diameter of the left end of the case is substantially smaller than the central portion of the case, but the diaphragm is located in the thick walled central portion of the case where it is protected from virtually all forces other than that developed by fluid pressure on either side of it.

The left end of the case has external threads 30 to receive the internal threads 32 of a first coupling adapter fitting 34 screwed and prestressed onto the left end of the case. The left end of the adapter includes a conventional tubing fitting, which is adapted to be connected to, say, one point in a fluid system (not shown) where pressure is to be sensed. The adapter fitting is sealed to the left end of the case by a stainless steel O-ring 38 mounted on an annular shoulder 39 around the left end of the case. A suitable sealant, such as that sold under the trade name "Loctite" provides an additional seal between the threads of the left end of the case and the adapter fitting. The adapter fitting is made up on the case with a force very near the yield point of the material to establish a stress barrier between the adapter fitting and the case. This permits the adapter fitting to be connected into various types of systems without the forces encountered in making the connection being transferred through the case proper, which could effect the operation of the instrument, as explained below.

A second coupling adapter 39A is sealed in a lateral large stepped bore 39B in the case and opening through a small bore 39C into the case interior on the right (as viewed in FIG. 1) side of the diaphragm 26. The second coupling adapter includes a longitudinal bore 39D in which is mounted a filter 39E. The outer end of the second adapter includes a conventional tubing fitting 39F which can be connected to another point in the fluid system (not shown) so the force on the diaphragm is responsive to the pressure difference in the system between the two points to which the first and second adapters are connected.

A force sensing assembly 40, which may be of the type shown in detail in FIGS. 2–5, is mounted in a "sandwich" array of first, second, and third annular disks 41, 42, 43, respectively, with the first disk 41 secured by rivets 44 in good heat-transfer relationship to the shoulder 23 in the case. The disks themselves are made of a good heat-conducting material, such as metal. The outside diameters of the annular disks are substantially equal to that of the second bore 22. The rivets 44 are countersunk in longitudinal stepped bores 46 around the periphery of the first disk 42. The shank of each rivet is surrounded by an electrical insulating sleeve 46A, to insulate the rivet shank from the disk while each rivet is spot welded to the second annular shoulder 23. The rivets are hot as they are welded to the shoulder, and shrink as they cool to draw the disk tightly against the second shoulder 23 in the case.

The second disk is secured by rivets 47 to the first disk, and includes an octagonal opening 48 in its center. Six longitudinal bores 50 extend from six corners of the octagonal opening to respective recessed outside surfaces 52 located around the periphery of the second disk to accommodate longitudinal electrical pins 54, which are connected to respective electrical leads 56 extending through insulating bushings 58 located in the longitudinal transverse bores 50 in the second disk.

The third disk is secured to the second disk by a pair of rivets 59 countersunk in a pair of diametrically opposed longitudinal stepped bores 59A in the periphery of the third disk. The face of the third disk adjacent the second disk includes four recesses 59B to receive the heads of the rivets 47 which hold the second disk to the first. Thus, the three disks are held tightly together and in good thermal contact with the case to enclose the force sensing assembly as described in detail below. The periphery of the third disk includes six recessed portions 59C aligned with the recessed surfaces 52 of the second disk to accommodate the longitudinal pins 54.

A first spring member 60 in the form of a symmetrical 4-arm cross is secured, say by spot welding, at the outer ends of its arms 61 to the right (as viewed in FIGS. 1 and 3) face of the second disk 42. The first spring member lies substantially in the plane of the right face of the second disk, and each arm is normal to a respective side of the octagonal opening in the second disk. Thus, the first spring member is secured so its extremities are immobile with respect to the second disk, while the inner portion of the spring can be moved in a direction normal to the major plane of the spring.

A separate pair of washers 62 are secured to the opposite faces of each arm 61 in the first spring member equidistant from the center of the first spring member and just inside of where each arm is connected to the second disk. A separate cylindrical sapphire post 64 extends through each pair of washers and each arm of the spring, and is rigidly bonded to the spring and washers, which in turn are welded to each respective spring arm. The location of a washer and part of a post on each side of each spring arm provides a balanced mounting in which the mass of the mounting means for each post on opposite sides of each arm is substantially equal. This improves the ability of the assembly to withstand shock and vibration without generation of spurious signals.

A first set of strain sensitive wires 66 are wrapped around the right (as viewed in FIGS. 1 and 3) ends of the posts 64. The first set of wires may be bifilar, and mounted on opposite arms of a 4-arm Wheatstone electrical bridge circuit (not shown) through suitable conventional connection to the leads 54, 56.

A second spring member 68 identical with the first is mounted in the same manner on the left face of the second disk. As can be seen best in FIG. 3, the second spring member is rotated 45 degrees about the longitudinal axis of the case with respect to the first spring member so each arm 70 of the second spring member is normal to a respective one of the remaining four sides of the octagonal opening in the second disk. Each arm 70 includes near its outer end a respective pair of collinear washers 72 mounted on its opposite faces, and a separate respective longitudinal sapphire post 74 extending through each pair of washers and respective arm, and bonded thereto. A second set of strain sensitive wires 76 are mounted on the left ends of the posts 74, and may also be bifilar and connected as the remaining opposite arms in the Wheatstone bridge circuit.

An elongated, stiff force rod 80 is connected at its right end to the left end of a hub 82 disposed between the centers of two spring members and rigidly securing them together. The left end of the force rod extends through the first disk 41 and bears against the center of the right face of the force summing diaphragm so that the force to be measured by the instrument is transmitted from the diaphragm along the force rod and to the central flexible portions of the spring members 60, 68. Thus, any force applied to the diaphragm is transmitted by the force rod to flex the arms of the flat flexible spring members. Since the outer ends of the arms of the springs are rigidly connected to the second disk, any longitudinal movement of the force rod causes one set of posts to move laterally with respect to each other in one direction and the other set of posts to move laterally with respect to each other in the opposite direction. For example, if the force rod is moved to the right, the posts 64 tend to spread apart and add additional strain to the first set of strain sensitive wires. This increases the resistance of the wires and the two opposite arms of the Wheatstone bridge in which they are connected. At the same time, the posts 74 tend to move inwardly and relax the strain on the second set of strain sensitive wires. This decreases the resistance of these wires and the resistance of the other two arms of the bridge in which they are connected. The change in resistance is measured electrically by conventional means, and the measurements serve to indicate the magnitude of the force applied to the diaphragm.

The entire body of each spring and the mounting points of each set of posts on each spring lie in a substantially common plane which also includes the points where each respective flat spring member is attached to the support ring. This arrangement, coupled with the rigid mounting of each post to its respective arm by the relatively small and light washers, provides a very low mass-to-spring ratio to eliminate interference from extraneous vibrations to which the instrument may be subjected.

Returning to FIG. 1, a connector closure 86 may be cemented or soldered into the right end of the case to form a sealed chamber 88, which is filled with the fluid whose differential pressure is to be measured. The electrical leads to connect the strain sensitive wires extend from the sealed chamber 88 through insulator bushings 90 in the connector closure, and may be connected to trimming resistors 92 located in the antechamber 94 formed between the connector closure and a cover cap 96 screwed onto the case and sealed thereto by an O-ring 98 around the left end of the case, and by a gasket 100 bearing against an outwardly extending flange 102 at the right end of the connector closure, which terminates at its right end in a conventional externally threaded cable connector 104.

The antechamber 94 permits the "trimming" or final adjustment of the instrument after the various components such as the strain sensing assembly 40 and the adapter fitting 34 have been set in their final positions, and the instrument has been aged and stabilized by subjecting it to cycled shock and temperature treatment.

Returning to FIGS. 1, 2, 4, and 5, the first set of strain wires 66 are disposed in a groove 110 in the face of the third disk adjacent the second disk. As shown most clearly in FIG. 4, the groove 110 follows a generally square shaped pattern, and the posts 64 are located in the corners of the groove.

In a similar manner, the second set of strain wires 76 are disposed in a generally square shaped groove 112 in the face of the first disk adjacent the second disk. The posts 74 are located in the corners of the groove 112.

Thus, each of the strain wires is surrounded on three sides by a body of high heat conductivity, and the wires are located closely adjacent the walls of the respective grooves in which they are disposed. The flat springs associated with each set of strain wires provides additional shielding or heat transfer surface closely adjacent their respective strain wires.

In the operation of the instrument shown in the drawings, the strain wires transmit heat to the heat conductive bodies or disks in which they are mounted. Since the two sets of strain wires are mounted almost symmetrically with respect to each other, any change in operating conditions affecting temperature works at substantially the same rate on each of the wires. Thus, there is no temporary difference in resistivity of the wires due to thermal effects. Moreover, the enclosure of the strain wires in the grooves in the heat conductive bodies or disks isolates them from the rest of the instrument and from each other, thereby reducing transient heat transfer effects as the operating temperature of the gage is varied.

The close spacing of the wires to the walls of the grooves makes the heat dissipation from the wires virtually independent of the density of the medium surrounding the wires.

FIG. 6 illustrates the improvement provided by this invention when used in a differential transducer of the type shown in FIGS. 1 through 5. The data represented by curve A in FIG. 6 are obtained by operating the strain gage shown in FIGS. 1 through 5 to measure differential air pressure without the first and third disks in place. With this arrangement, the percentage error increases rapidly with line pressure until a maximum of about 10% is reached in the vicinity of about 400 lb. per square inch total pressure. Curve B shows the data that are obtained when the strain gage is operated with the first and third disks mounted in accordance with this invention. This curve shows that the percentage error is less than ½ of 1% throughout the entire range of zero to 500 lb. per square inch.

We claim:

A transducer of the unbonded strain gage type comprising a hollow case, a first set of supports mounted in the case to be movable with respect to each other, a first strain sensitive wire mounted to be supported by a portion of the first set of supports, a first heat conductive body having a groove defined by surfaces of the body, the first strain sensitive wire and the portion of the first set of supports supporting the wire being disposed within the groove adjacent said surfaces in heat transfer relationship therewith, a second set of supports mounted in the case to be movable with respect to each other, a second strain sensitive wire mounted to be supported by a portion of the second set of supports, and a second heat conductive body having a groove defined by surfaces of the body, the second strain sensitive wire and the portion of the second set of supports supporting the wire being disposed within the groove adjacent said surfaces in heat transfer relationship therewith, the spacing of the first wire from the surfaces of the first heat conductive body being substantially equal to the spacing of the second wire from the surfaces of the second heat conductive body so that heat transfer from the first strain wire to the first heat conductive body occurs at substantially the same rate as heat transfer from the second strain wire to the second heat conductive body.

References Cited in the file of this patent

UNITED STATES PATENTS

| | | |
|---|---|---|
| 2,886,678 | Curtis | May 12, 1959 |
| 2,948,873 | Giovanni | Aug. 9, 1960 |